United States Patent [19]

Minamida et al.

[11] Patent Number: 4,947,023
[45] Date of Patent: Aug. 7, 1990

[54] METHOD AND APPARATUS FOR ROLL DULLING BY PULSE LASER BEAM

[75] Inventors: Katsuhiro Minamida; Junya Suehiro, both of Sagamihara, Japan

[73] Assignee: Nippon Steel Corporation, Tokyo, Japan

[21] Appl. No.: 305,121

[22] PCT Filed: Feb. 24, 1988

[86] PCT No.: PCT/JP88/00194
 § 371 Date: Oct. 18, 1988
 § 102(e) Date: Oct. 18, 1988

[87] PCT Pub. No.: WO88/06504
 PCT Pub. Date: Sep. 7, 1988

[30] Foreign Application Priority Data

Feb. 24, 1987 [JP] Japan .................... 62-40777
Feb. 24, 1987 [JP] Japan .................... 62-40778
Mar. 14, 1987 [JP] Japan .................... 62-59860
Dec. 11, 1987 [JP] Japan .................... 62-313620
Feb. 3, 1988 [JP] Japan .................... 63-22038

[51] Int. Cl.$^5$ ............................................. B23K 26/00
[52] U.S. Cl. .............................. 219/121.68; 219/121.61
[58] Field of Search .................. 219/121.61, 121.62, 219/121.68, 121.69, 121.76; 372/10

[56] References Cited

U.S. PATENT DOCUMENTS

| | | | |
|---|---|---|---|
| 3,404,254 | 10/1968 | Jones | 219/121.69 |
| 3,622,739 | 11/1971 | Steffen | 219/121.62 |
| 4,087,672 | 5/1978 | Yi | 219/121.68 |
| 4,675,872 | 6/1987 | Popek et al. | 372/10 |

FOREIGN PATENT DOCUMENTS 58-79788 5/1983 Japan.

*Primary Examiner*—C. L. Albritton
*Attorney, Agent, or Firm*—Wenderoth, Lind & Ponack

[57] ABSTRACT

When the power output of a continuous wave oscillated laser is changed to a pulsed laser by Q-switching, in the conventional method of Q-switching, if the pulse repetition rate is changed, the condition of oscillated excitation is changed and the pulse waveform or pulse peak power are simultaneously changed; and therefore, a stable dulling process is impracticable.

The present invention decreases the cavity loss of a laser oscillator during a pulse off by decreasing power output of the radio-frequency signal applied to the Q-switch, and consequently, controls the pulse waveform to that required for the roll dulling process. In accordance with the method of the invention, the roughness of the dulled roll surface consists of innumerable small craters and is suitable for a high speed fine dulling process.

16 Claims, 18 Drawing Sheets

Fig. 7(a-1)
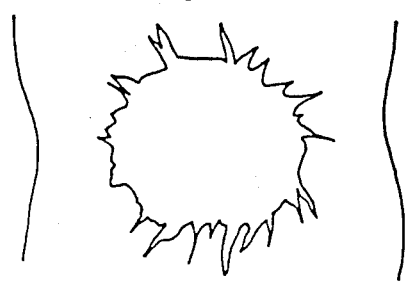
Fig. 7(a-2)
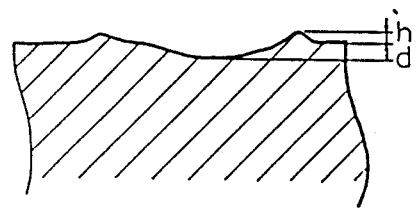
Fig. 7(b-1)
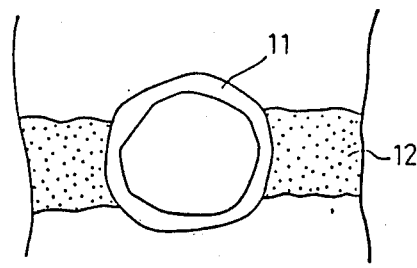
Fig. 7(b-2)
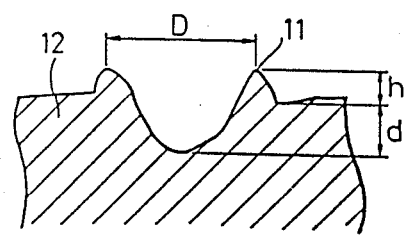

METHOD AND APPARATUS FOR ROLL DULLING BY PULSE LASER BEAM

TECHNICAL FIELD

The present invention relates to a method and apparatus for dulling a surface of an article such as a roll by a laser beam, and in particular for ensuring appropriate conditions for such dulling by controlling a pulse waveform of a Q-switched laser beam.

BACKGROUND ART

The methods of dulling a roll include, among others, shot-blasting, electric discharge machining, and working the roll surface by a laser.

An apparatus for dulling the roll surface by a laser is disclosed in Japanese Examined Pat. Publication (KOKOKU) Nos. 58-25557 and 60-2156.

The apparatuses disclosed in the above Pat. Publications dull the surface of a roll with a pulsed laser beam projected from a laser source of a YAG laser, ruby laser, or the like by Q-switching, and are characterized by providing a laser beam splitter which irradiates the surface of a rotating roll (Japanese examined Pat. Publication No. 58-25557) and controls which a number of laser beam pulses emitted from the laser beam splitter in accordance with a dulling shape (Japanese Examined Pat. Publication No. 60-2156).

To dull the roll surface, the roll surface must be periodically worked with a pulse laser having a predetermined repetition rate, pulse width, and peak value.

Such a pulse laser output can be provided by pulsing a continuous-wave (CW) laser output using a mechanical optical apparatus (chopper, shutter, etc.) as shown in FIG. 2, or by using a pulse laser or Q-switched laser beam (as shown in FIG. 3).

In the Q-switched pulse laser, since a mechanical device is not required, the equipment can be made compact and simple and the pulse repetition rate can be easily controlled over a wide range, in comparison with other methods. However, when the frequency is changed by the Q-switching, as shown in FIG. 4a and FIG. 4b, since the oscillation and excitation conditions vary, the pulse waveform and peak value output are also varied at the same time, and thus a stable dulling operation cannot be obtained. Also, the peak value ($Pl_1$) of the leading pulse is very much larger than those of the subsequent pulses ($Pl_2$, $Pl_3$, $Pl_4$, ---), as shown in FIG. 1a.

Furthermore, the conventional Q-switched pulse laser beam generally has a fault in that an average pulse peak value $\overline{(Pl_p)} = (Pl_1 + Pl_2 + Pl_3 + pe_4)/4)$ is $10^5 - 10^5$ Watts (W) and a half-power width (tp) is less than 1 micro second conversion of the pulse peak value into power strength (W/cm$^2$) is shown in FIG. 5), and the working (rater formation) domain is not suitable for dulling. Namely, working parts are evaporated, and therefore, a crater-shaped hole cannot be formed, as shown in FIGS. 7($a-1$) and 7($a-2$) (height h or depth d of the uneven surface is less than 1 μm).

Japanese Examined Pat. Publications No. 58-25557 and No. 60-2156 mentioned above do not disclose a solution to the above problems of the conventional techniques. The dulling of a roll surface of a rolling mill is disclosed in other published documents, e.g., Japanese Examined Pat. Publication No. 61-28436 and U.S. Pat. No. 4,329,562.

The above JEPP '436 discloses a process in which two luminous fluxes are intermittently focused a lens through a circular rotating plate having a transmission zone and a reflection zone, onto the roll surface, and the above USP 562 discloses a process by which a specific motif or motif patterns are formed on the roll surface of the rolling mill.

The above publications do not disclose a solution to the above-noted problems of a Q-switched pulsed laser.

DISCLOSURE OF THE INVENTION

Therefore, the present invention efficiently forms a desired shape crater on the roll surface of the rolling-mill by controlling the nonuniformity, the pulse peak value, and the half-width value of the pulse waveform of a Q-switched pulse laser, which are the problems of the conventional techniques as mentioned above, to the respective domains thereof suitable for dulling a roll, and increases the efficiency of the control of not only a single pulse but also a pulse group.

The invention will be further described with reference to the accompanying diagrammatic drawings.

First, the mechanism of generating the Q-switched pulse laser beam is described as follows, with reference to FIG. 3. Namely, a desired excitation energy (light source) is continuously applied-to a laser rod 1 arranged between reflecting mirrors 3 and 4. Like Q-switched element 2 is composed of a fused quartz, an absorber, and an acousto-optic modulator and and disposed between the laser rod 1 and the reflecting mirror 4 at a predetermined angle to a laser optical resonates axis. The Q-switched element 2 is supplied with a high frequency signal (this signal is modulated by an RF output modulated signal) from a radio frequency signal source (RF) 5, a such that diffraction grating is formed inside the fused quartz to generate a diffracted light 6. As a result, the loss inside the resonator 7 is increased and the energy is accumulated in the laser rod 1. Then, when the RF signal applied to the Q-switched element is turned off by an RF output modulated signal, the diffraction grating in the fused quartz is extinguished and the diffraction light 6 eliminated, and the loss in the resonator 7 is decreased. As a result, the energy accumulated in the laser rod 1 is instantaneously radiated to provide a laser pulse having a high pulse peak value. Namely, as shown in FIG. 6, the energy at a level $E_{max}$ is accumulated in the laser rod 1, and when this energy is instantaneously discharged to a level $E_{min} (\approx 0 W)$, the laser output forms a laser pulse having a high pulse peak value of from $P_{min}$ to $P_{max}$.

Using the concept that the pulse peak value and half width, etc., of the subsequent pulse can be controlled by controlling the accumulation of energy ($E_{max}$) of the laser rod 1, the inventors of the present invention effected the following methods:

(1) A method of reducing the pumping energy (light source) which pumped the laser rod 1;

This method is the simplest, but it was found that, where a plurality of pulses a generated in the grouping as shown in FIG. 1a, the pumping energy is decreased and the subsequent pulses $P_2$ to $P_4$ are eliminated, and thus the number of pulses necessary for working cannot be provided.

(2) A method of inhibiting the accumulation of excessive energy in the laser rod 1 by reducing the loss in the resonator while the pulse is turned off:

This method reduces the value of $E_{max-Emin}$ ($\approx$0 W) in FIG. 6, i.e., decreases the $E_{max}$ value, and can be effected in three ways:

(2)-1: Changing the installation angle and position of the Q-switching element 2.

(2)-2: Making the pumping energy sent to the laser rod 1 higher than the upper limit of transmission blocking of the Q-switched element 2.

(2)-3: Lowering the RF power applied to the Q-switched element 2.

It was found from the results of the inventor's experiments that, in any of the above three ways, a constant continuous output P shown in FIG. 1b is generated, the ratio of a leakage output $P_L$ to the total output $P_T$ can be adjusted, the first pulse $P_1$ has a reduced pulse peak value ($P_1<_{pel}$), the pulse peak value $P_1$ to Phd i of the pulses in the same group can be adjusted to a same level correspondingly, and that the pulse half width $t_p$ is increased ($t_p>tlp$).

The method (2)-1 requires an advanced technique for adjustment of the angle and position of the Q-switching element, the method (2)-2 is not advantageous in that the energy consumption is large, and the method (2)-3 is the simplest and most desirable.

Namely, when the RF output applied to the Q-switched element 2 is reduced, the ratio of the leakage output $P_L$ to the total $P_T$ in the laser rod 1 is increased. FIG. 8 depicts this relationship and indicates the correction between the RF output and the leakage output when the total average output $P_T$ is 70 [W] and the maximum RF output is 50 [W]. It is proven that, when the RF output is less than 40 [W] the leakage output increases rapidly. Also, the pulse peak value $P_p$ can be reduced by increasing the leakage output $P_L$, in accordance with the difference between $P_T$ and $P_L$, i.e., $\Delta P$ ($\Delta P=P_T-P_L$ as shown in FIG. 8), which contributes to the pulse peak value $\overline{P_p}$. FIG. 9 shows this and indicates the correction between the leakage output $P_L$ and the average pulse peak value $P_p$ and the pulse half width $t_p$. It is proven that, when the leakage output $P_L$ is increased, the average pulse peak value $\overline{P_p}$ is reduced as shown by curve A and the pulse half width is increased as shown by curve B.

Namely, in accordance with this invention, the leakage output is increased, and therefore, the average pulse peak value is reduced and the first pulse peak value is reduced and thus the first pulse peak value can be maintained at a same level as another pulse peak value in a group. Moreover, the pulse half width can be increased, and therefore, when the roll surface is dulled by this invention, desired craters can be formed. FIGS. 7(b-1) and 7(b-2) show such craters, and thermally-affected zones 12 caused by the leakage output formed on the roll surface. The concavity of the craters can impart a desired roughness to the surface of a rolled steel plates, and since the thermally-affected zones 12 have no irregularities, the rolling of a steel plate can be effected without an adverse affect thereon.

BRIEF DESCRIPTION OF THE DRAWINGS

FIGS. 7 (a-1) 7(b-1) 7(b-1) 7(b-2) show sectional and plan views of a roll surface laser worked by the method according to the conventional technique and the present invention;

FIG. 18a is a time chart of the generation of a single pulse laser; wherein

BEST MODE OF CARRYING OUT THE INVENTION

Embodiments of the method of the present invention will be described herebelow:

Embodiment 1

Figure 10:
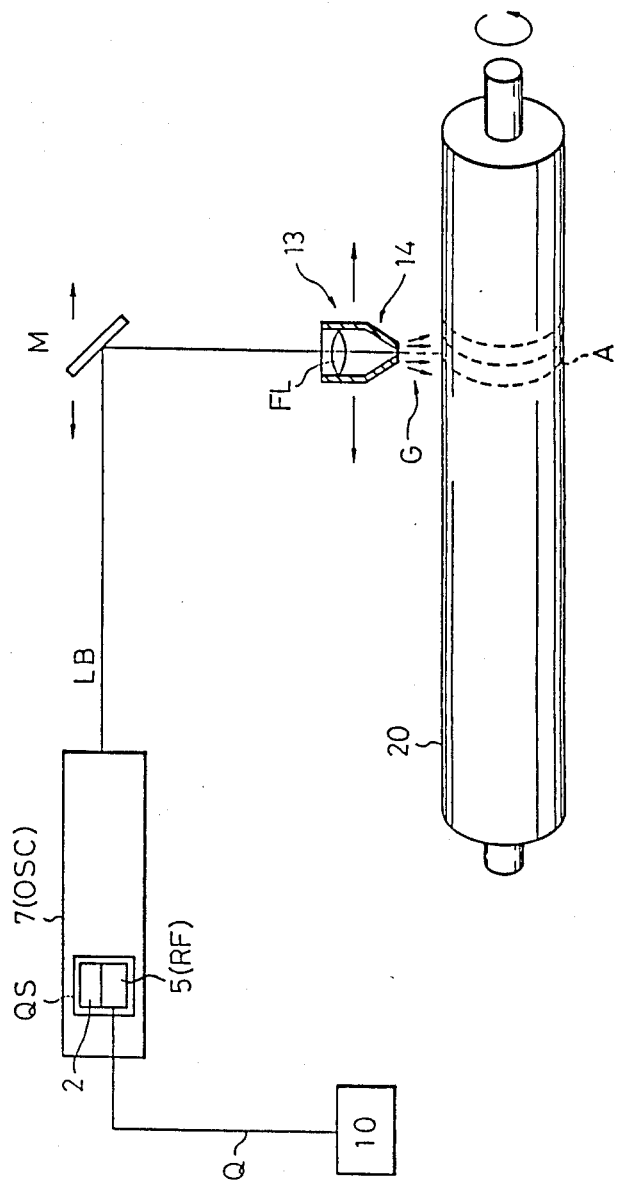
FIG. 10 is a view of the apparatus for dulling the roll surface by a laser of the present invention.

FIG. 10 is a view of the apparatus for dulling the roll surface by a laser of this embodiment.

The pulsed laser beam oscillator (DSC) 7 is a YAG laser oscillator having an average output of over 100 [W], and can oscillate a Q-switched pulsed laser beam LB having a frequency of 1–40 kHz. The laser beam LB is made incident onto the roll surface by a plurality of bending mirrors M (only one mirror shown in the drawing) and a focusing lens FL. A laser beam incident head 13 is moved roll-axially by a drive mechanism (not shown). A nozzle 14 is set at a top of the laser beam incident head to emit a gas, e.g., nitrogen, oxygen or argon gas, supplied from a gas supply source (not shown).

The Q-switch QS comprises the Q switching element 2 and the radio frequency signal source (RF) 5.

Reference numeral 10 denotes a controlling system comprised of a circuit which generates the RF output modulated signal Q.

A process by which the surface of a roll 20 is worked by the above mentioned apparatus will be described herebelow.

The pulsed laser beam LB generated by the process, described herebelow, is made incident on the surface of the roll 20, which is rotating at a constant speed.

Figure 1A:
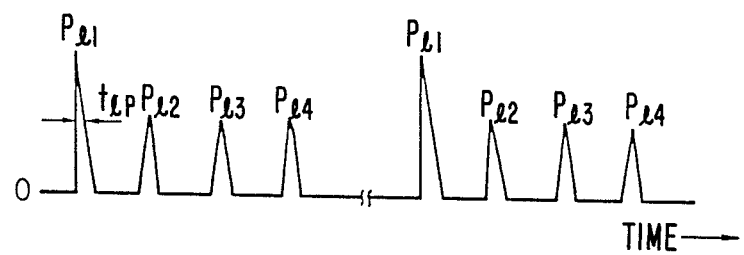
FIGS. 1a and 1b show pulse wave forms for a comparison of the Q-switched pulsed waveform of the conventional technique and of the present invention.
Figure 1B:
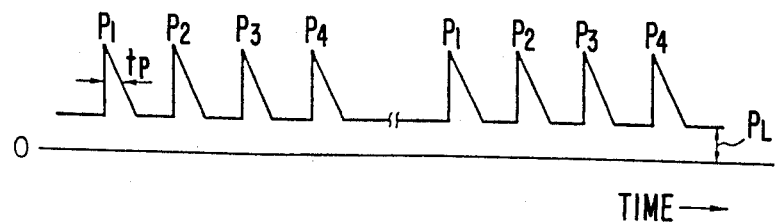
Figure 2:
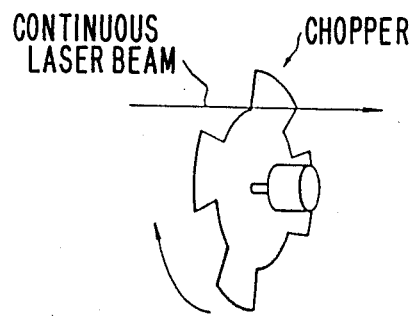
FIG. 2 is a perspective view of a method of pulsing the continuous-wave laser beam by a mechanical device such as a chopper.
Figure 3:
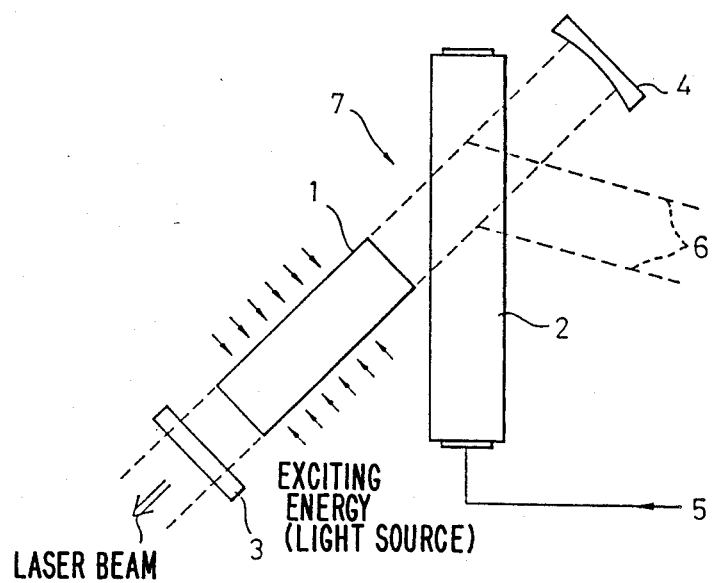
FIG. 3 is a block diagram showing the construction of a solid state laser oscillator using a Q-switched element.
Figure 4A:
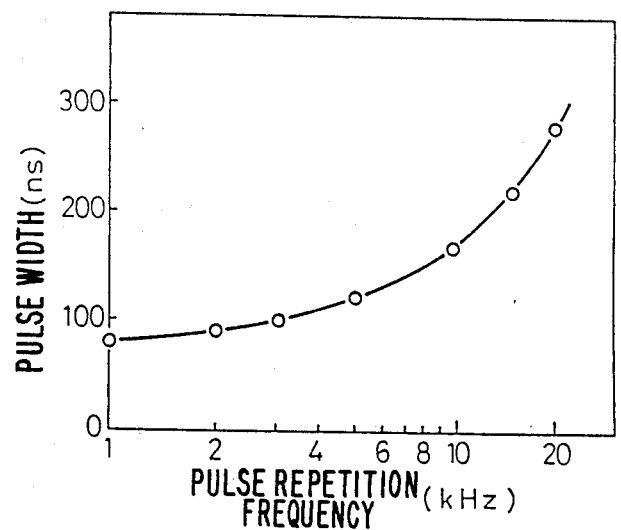
FIG. 4a and 4b are graphs indicating the relationship between the frequency and pulse waveform of the Q-switched pulse.
Figure 4B:
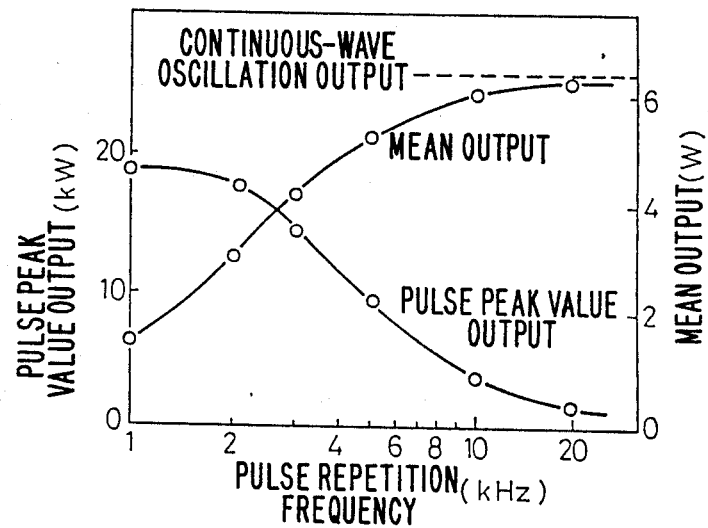
Figure 5:
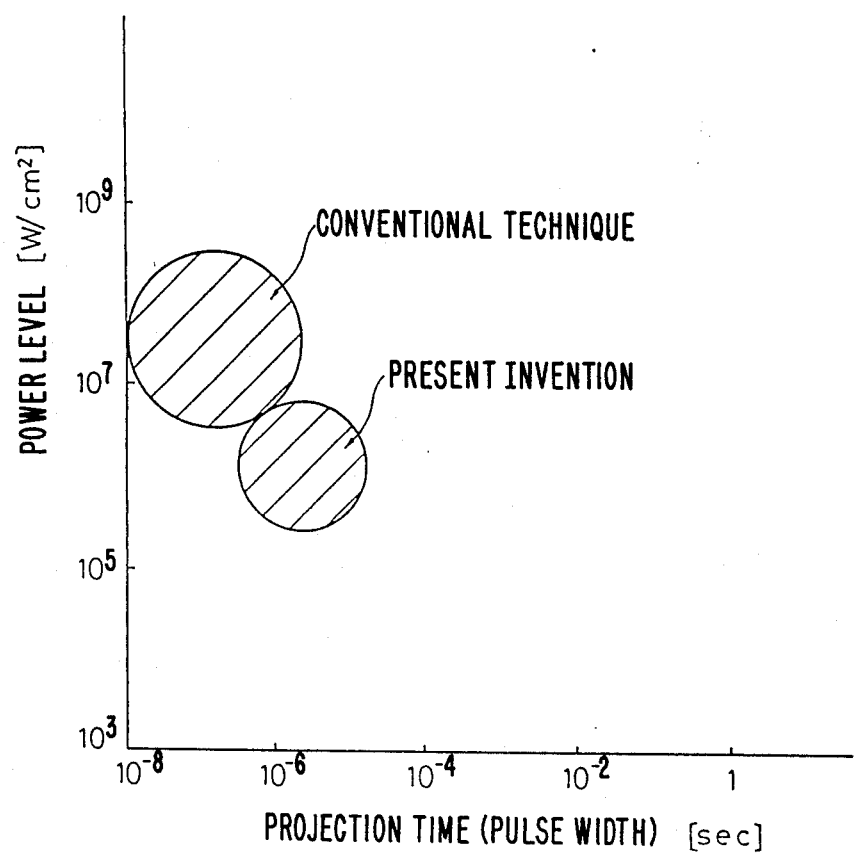
FIG. 5 is a graph indicating the relationship between the laser projecting conditions and working phenomenon.
Figure 6:
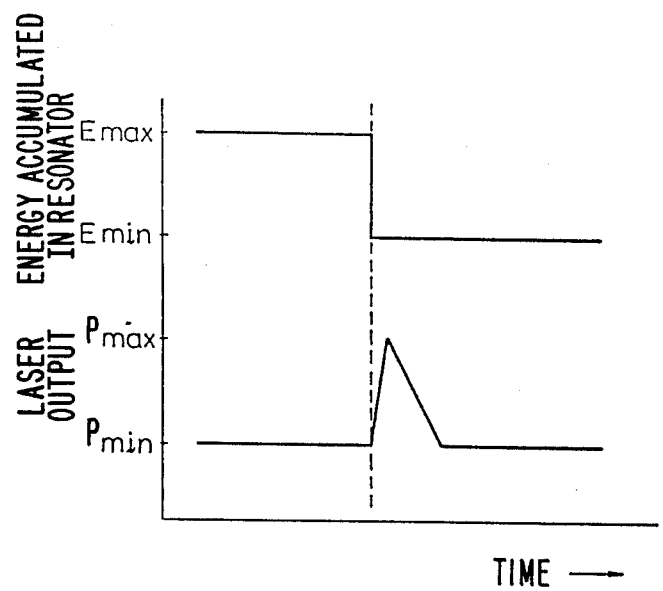
FIG. 6 shows a pulse waveform indicating the mechanism which produces the Q-switched pulse waveform.
Figure 8:
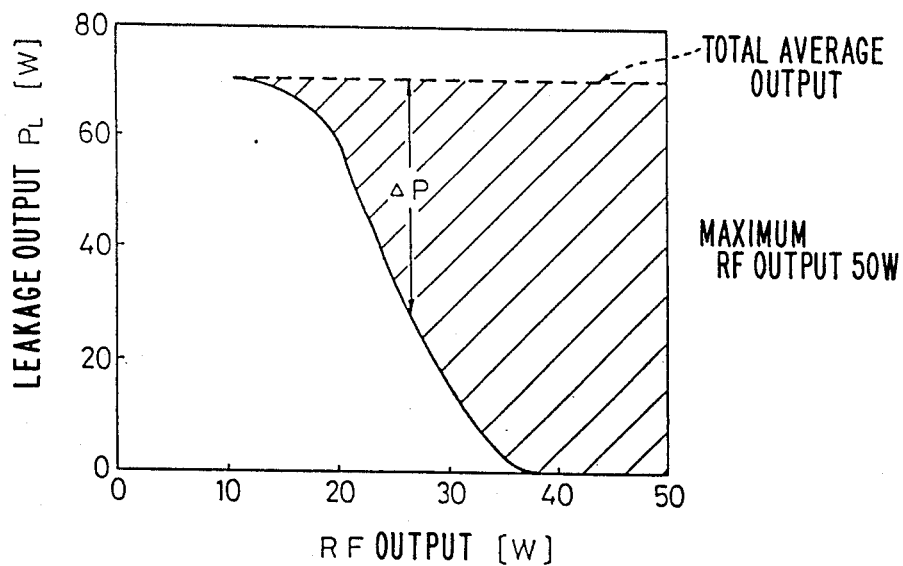
FIG. 8 is a view indicating the correlation between the RF output and the leakage output.
Figure 9:
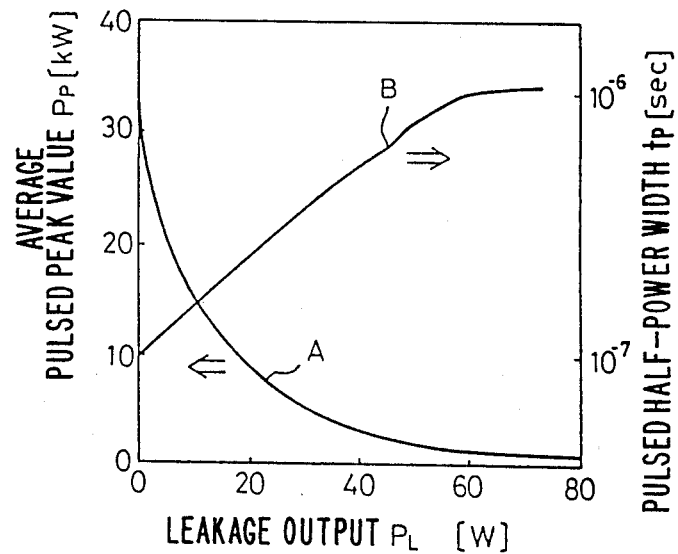
FIG. 9 is a view indicating the correlation between the leakage output and the average pulse peak value and the pulse half-power width.

The signal Q generated from the controlling system 10 is input to the radio frequency signal source RF 5, and the signal is modulated to a desired waveform at the signal source 5 and applied to the Q-switching element 2, where the RF output is controlled (lowered) and the pulse waveform shown in FIG. 1b, for example, is generated. The pulsed laser beam LB generated in accordance with the above pulse waveform is made incident on the roll surface.

By controlling the RF input, the most suitable pulsed laser beam for dulling can be irradiated and a crater-shape type motif A can be formed. When the pulsed laser beam incident head 13 is moved at a constant speed by a drive mechanism, the above mentioned pulsed laser beam is irradiated, and the motif A can be formed on the surface of the roll 20 at regular intervals and as a constant pattern.

Next, the characteristics of Q-switched pulse of the YAG laser in accordance with the present invention and prior art will be compared in Table 1.

became 30 W and an output of 40 W was used to form the pulse.

Conventionally, in the case A, the output used to form the pulse was 30% higher, the melt evaporation value was increased, the unevenness of the craters was decreased, in that h was 1 to 2 $\mu$m, d was 2 to 6 $\mu$m, and D was 100 to 200 $\mu$m.

Embodiment 2

Next, the present invention will be described in detail, whereby a group of laser beams is formed by oscillating a plurality of Q-switched laser beams produced by a Q-switched control system.

Figure 11:
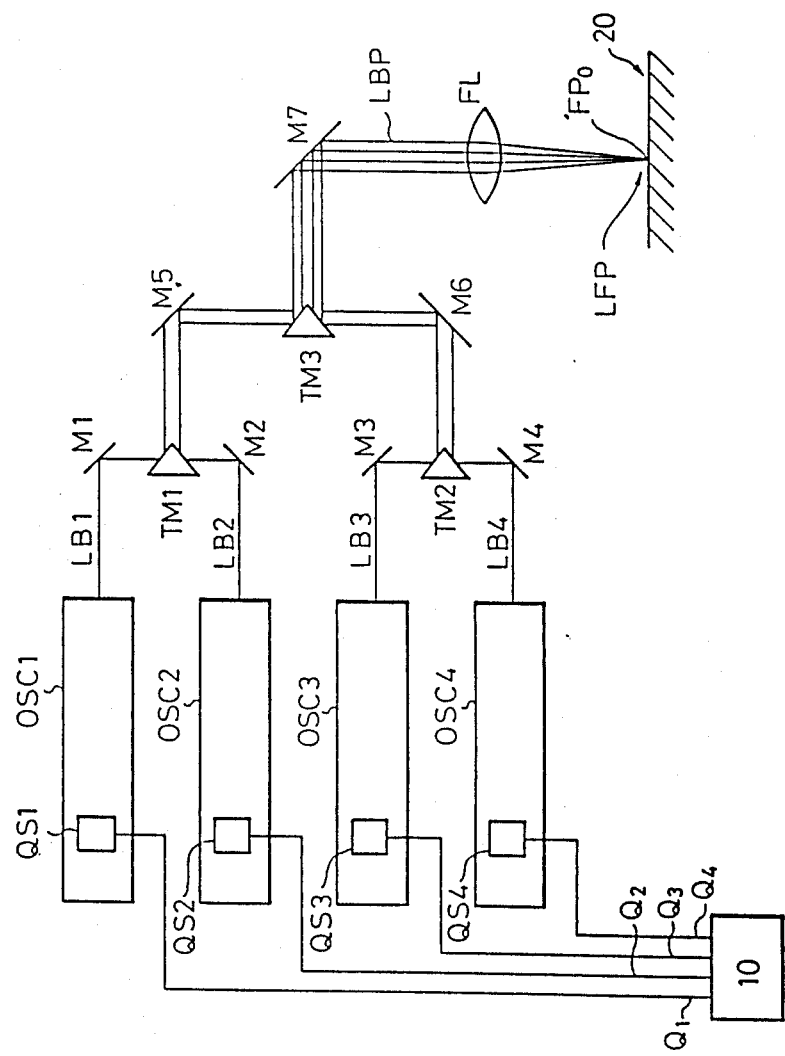
FIG. 11 is a block diagram showing the construction of the laser beam output device according to another embodiment of the present invention.

FIG. 11 shows the basic construction of a pulsed laser beam controller according to the present invention, in which four pulses are used. OSC1 to OSC4 indicate laser oscillators, and OS1 to OS4 indicate Q-switches containing the high frequency signal source RF, and corresponding to the OSC1 to OSC4. Reference number 10 denotes a control system for the Q-switches, from Q-switched signals $Q_1$ to $Q_4$ are output, laser beams LB1 to LB4 are generated by the OSC1 to OSC4 and combined into a group LBP of parallel laser beams by bending mirrors M1 to M7 and combining mirrors TM1 to TM3. The laser beam group LBP is focused by a focusing lens FL into a focused laser beam group LFP at a focal point $FP_0$ in such a manner that a single beam is formed. Reference numeral 20 denotes the surface of a roll to be worked. Although beams are shown in FIG. 11, the number of laser beams is not limited thereto, since when the number of laser beam is increased, the depth of a hole is almost linearly increased, and thus the number of laser beams is selected according to the quality of the roll surface roughness to be dulled.

Figure 12:
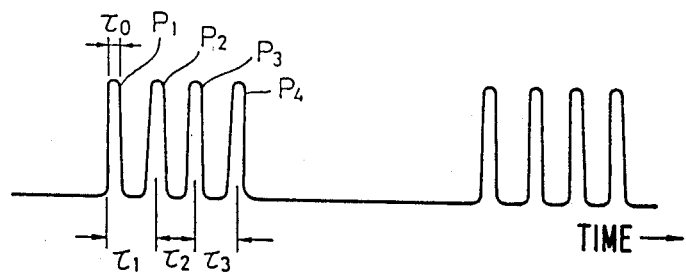
FIG. 12 is a pulse waveform diagram showing the output state of a pulse group according to the present invention.

FIG. 12 shows the ideal pulse waveform for dulling the roll surface. The symbol $\tau_0$ indicates the width of each laser pulse, $\tau_1$ indicates the interval between the first pulse $PL_1$ and second pulse $PL_2$, and $\tau_2$ indicates the interval between the second pulse $PL_2$ and third

TABLE 1

| | Exciting energy [kw] | RF output [%] | Total average output $P_T$ [W] | Leakage output $P_L$ [W] | Pulsed peak value [W] | | | | Pulsed half-power width $t_p$ ($t_{lp}$) [sec] | Energy density [w/cm$^2$]* |
| | | | | | $P_1$ ($Pl_1$) | $P_2$ ($Pl_2$) | $P_3$ ($Pl_3$) | $P_4$ ($Pl_4$) | | |
|---|---|---|---|---|---|---|---|---|---|---|
| Conventional technique | 6 | 100 | 70 | 0 | $\approx 10^5$ | $\approx 10^4$ | $\approx 10^4$ | $\approx 10^4$ | $\approx 10^{-7}$ | $10^7$–$10^8$ |
| Present invention | | | | | | | | | | |
| A | 6 | 40 | 70 | 60 | $\approx 2 \times 10^3$ | $\approx 2 \times 10^3$ | $\approx 2 \times 10^3$ | $\approx 2 \times 10^3$ | $\approx 10^{-6}$ | $\approx 10^6$ |
| B | 6 | 50 | 70 | 30 | $\approx 5 \times 10^4$ | $\approx 2 \times 10^4$ | $\approx 10^4$ | $\approx 10^4$ | $\approx 5 \times 10^{-7}$ | $\approx 10^7$ |

*When beam converging diameter is 100 $\mu$m

In the present invention A, when the RF output was supplied to the Q-switch at a value 40% less than the conventional technique value, the leakage output became 60 W, the total average output became 70 W, and the output was used to form a pulse of only 10 W, as shown in the above table, and an ideal laser pulse was formed for dulling.

As a result, craters were formed, having a height of the concavity h of 2 to 3 $\mu$m, a depth d of 5 to 10 $\mu$m, and a diameter D of 100 to 200 $\mu$m, as shown in FIG.7(b-2).

Also, in the present invention B, when the RF output was supplied to the Q-switch at a value 50% less than the conventional technique value, the leakage output pulse $PL_3$. As shown in FIG. 12, the ideal pulse waveform suitable for roll dulling is such that $$PL_1 PL_2 = --= PL_n \text{ and } \tau_1 = \tau_2 = --= \tau_{n-1}.$$

Figure 13:
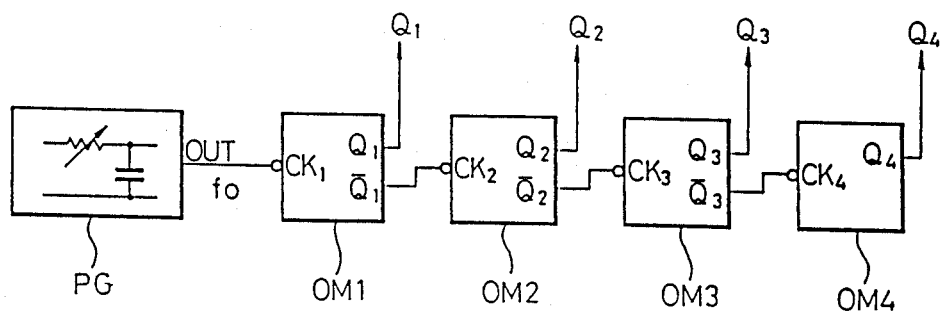
FIG. 13 is a block diagram showing the control circuit for the Q-switching control system.
Figure 14:
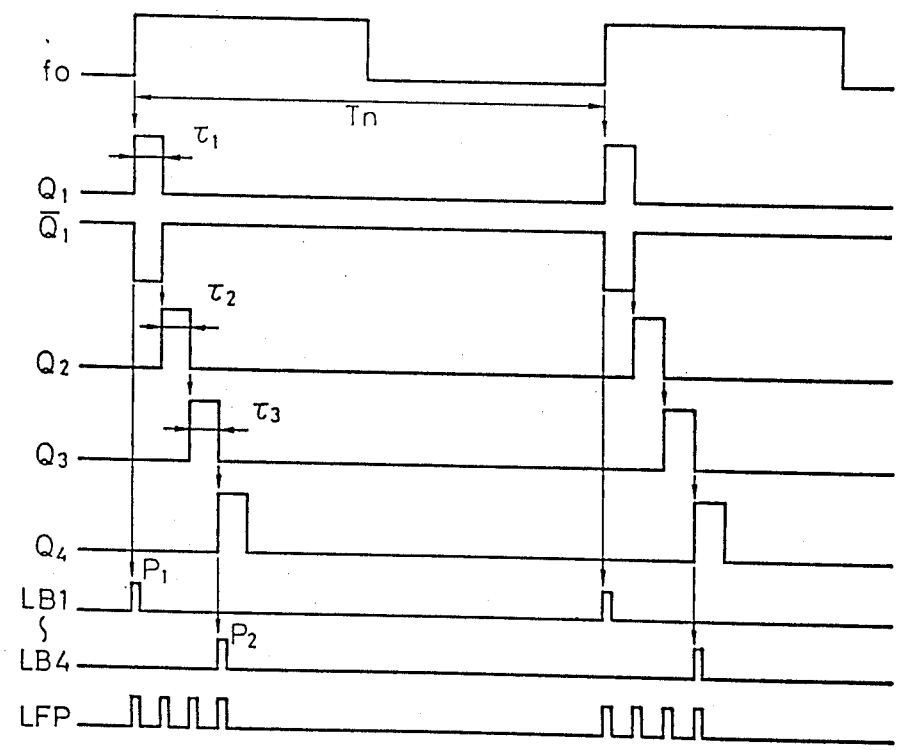
FIG. 14 is a functional time chart showing the relationship among the control signals.

A circuit diagram of the Q-switch control system 10 is shown in FIG. 13, and a functional time chart of the control signals is shown in FIG. 14.

As shown in FIG. 13, the circuit of the Q-switch control system consists of a pulse generator PG for determining a frequency $f_0$ of the pulse group, and one-shot multivibrators $OM_1$ to $OM_4$ for determining the pulse intervals $\tau_1$ to $\Sigma_3$ in the pulse group. As shown in FIG. 14, $OM_1$ to $OM_4$ are synchronous with leading edges of the respective input signals thereof.

Namely, the output signal $f_0$ from the pulse generator PG is supplied to the clock $CK_1$ of $OM_1$, whereby a pulse $Q_1$ of the pulse interval $\tau_1$ set at the $OM_1$ synchronously with the leading edge of the output signal $f_0$ is generated, and simultaneously, a signal $\overline{Q_1}$, having an opposite polarity to that of the pulse $Q_1$ is delivered and supplied to the clock $CK_2$ of $OM_2$; the pulses $Q_2$ and $\overline{Q_2}$ are produced in the same way. This also holds true for $OM_3$ and $OM_4$.

As described above, the frequency $f_0$ of the pulse group for dulling is set by PG, and a group of pulses with a predetermined time delay therebetween is generated synchronously with the first signal, and the above pulses $Q_1$ to $Q_4$ control a generated signal of the high frequency signal source RF in the Q-switches $QS_1$ to $QS_2$, to thereby effect a control of the Q-switches for the laser beams $LB_1$ to $LB_4$.

A roll was dulled by controlling the pulse waveforms of four Q-switched laser beams by the method of the present invention. The waveform controlling conditions of the Q-switched laser pulse beam were as follows:

| | |
|---|---|
| $\tau_1$ to $\tau_3$ | 5 µs |
| $LB_1$–$LB_4$ | 2 kW |
| $f_0$ | 20 kHz |
| FL | 25 mm |
| RF output | 40% |

The results of the dulling were a bore diameter of 100 µm and a roughness of 5 µm. The transfer to the steel plate was as high as 80% and the abrasion resistance was also improved.

In the above embodiment, since a peak value can be set for each pulse of a pulse group, the fusing and evaporation during the process of dulling an object to be worked in the drilling process for roughening the surface of the object can be more effectively controlled than in the embodiment 1, and craters having suitable shape and hardness can be formed. (For example, a height of a concavity of a crater of embodiment 1 is 3 µm at maximum, but in this embodiment a height of a concavity of a crater of more than 5 µm can be constantly formed.)

Also, since the pulse interval in the pulse group can be controlled, a drilling suitable for dulling can be conducted. Namely, the present convention is very effective for use in roll dulling.

Embodiment 3

In this example, a beam pulse expander BX is set between the laser oscillator OSC and the bending mirror, and therefore, in addition to the effect of the embodiment 2, the diameters of the laser beams (the product beam diameter D and the divergence angle $\theta$ is constant) are enlarged, respectively.

Figure 15:
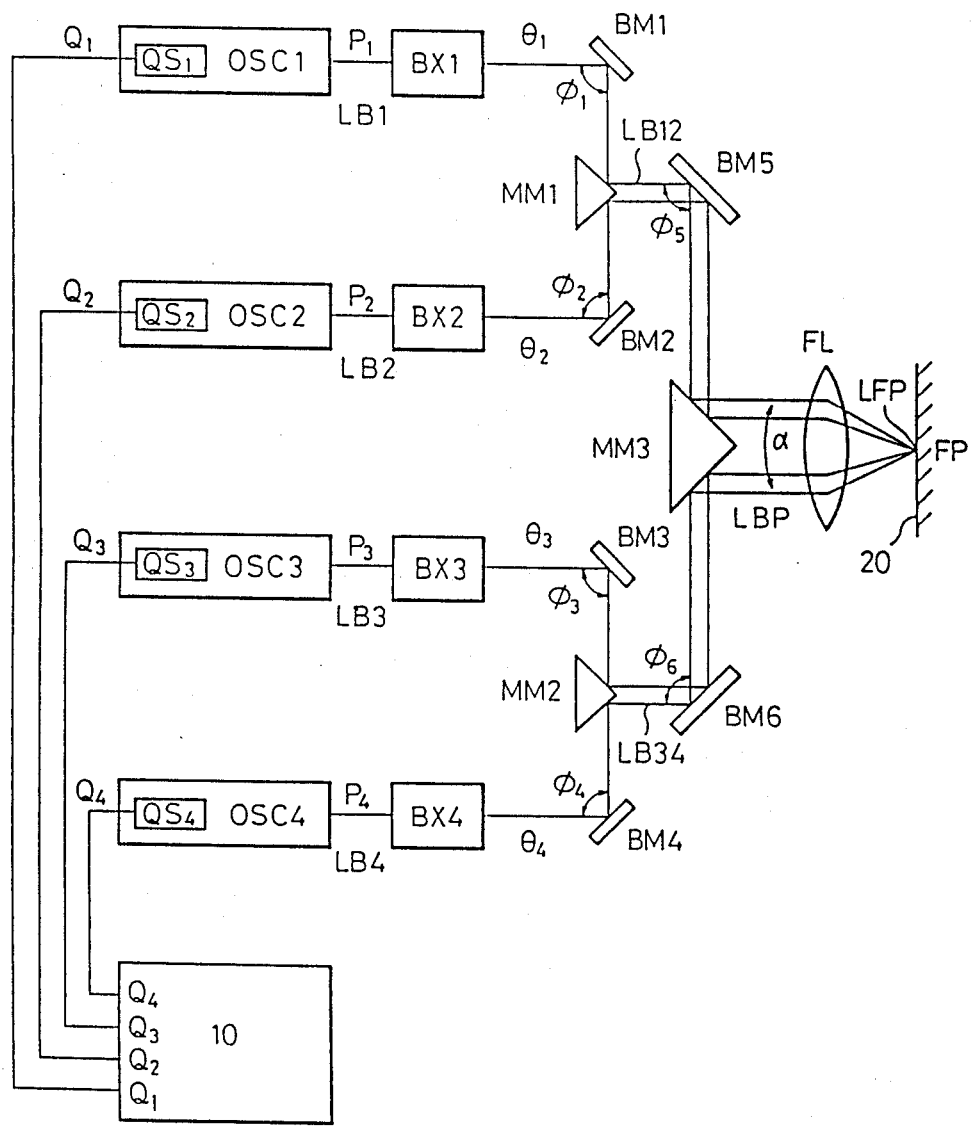
FIG. 15 is a block diagram showing the construction of the pulsed laser beam output device according to another embodiment of the present invention.

FIG. 15 shows the basic construction of the pulse laser controller using four pulses according to the above-mentioned embodiment, wherein $OSC_1$ to $OSC_4$ denotes laser oscillators, respectively, and $QS_1$ to $QS_4$ denote Q-switches, respectively, and correspond to the $OSC_l$ to $OSC_4$, respectively. Reference numeral 10 denotes a Q-switch control system which delivers Q-switching signals $Q_1$ to $Q_4$, and laser beams $LB_1$ to $LB_4$ are generated from the $OSC_1$ to $OSC_4$. The laser beams $LB_1$ to $LB_4$ have diameters enlarged, respectively, by the beam pulse expanders $BX_1$ to $BX_4$ so that the laser beams $LB_1$ to $LB_4$ have divergence angles of $\theta_1$ to $\theta_4$.

These laser beams $LB_1$ to $LB_4$ are merged into a single laser beam group LBP by bending mirrors $BM_1$ to $BM_6$ and merging mirrors $MM_1$ to $MM_3$.

The laser beam group LBP is focused at a focusing point $FP_0$ by a focusing lens FL into a focused laser beam group LFP, as in the focusing of a single laser beam. Reference numeral 20 denotes the surface of a roll to be dulled.

The focused diameters $d_1$ to $d_4$ of lasers beam $LB_1$ to $LB_4$ of the focused laser beam group LFP are the products of beam divergence angles $\theta_1$ to $\theta_4$ and the focal length fe of the focusing lens FL, respectively, as follows:

$$d_1 = fl \times \theta_1, d_2 = fl \times \theta_2,$$
$$d_3 = fl \times \theta_3, d_4 = fl \times \theta_4$$

These focused beam diameters $d_1$ to $d_4$ and set peak values can be used to determine the hole diameter and depth worked by the respective laser beams.

As shown in FIG. 15, by controlling the beam angles $\phi_1$ to $\phi_6$ at the bending mirrors $BM_1$ to $BM_6$ according to the angle defined by the reflecting plane defined by the pair of merging mirrors, the laser beams in the merged beam group LBP can be made parallel to each other with the angle $\alpha$ defined between the beams in the beam group LBP being zero degrees, or not parallel to each other with the angle $\alpha$ being limited.

Figure 16:
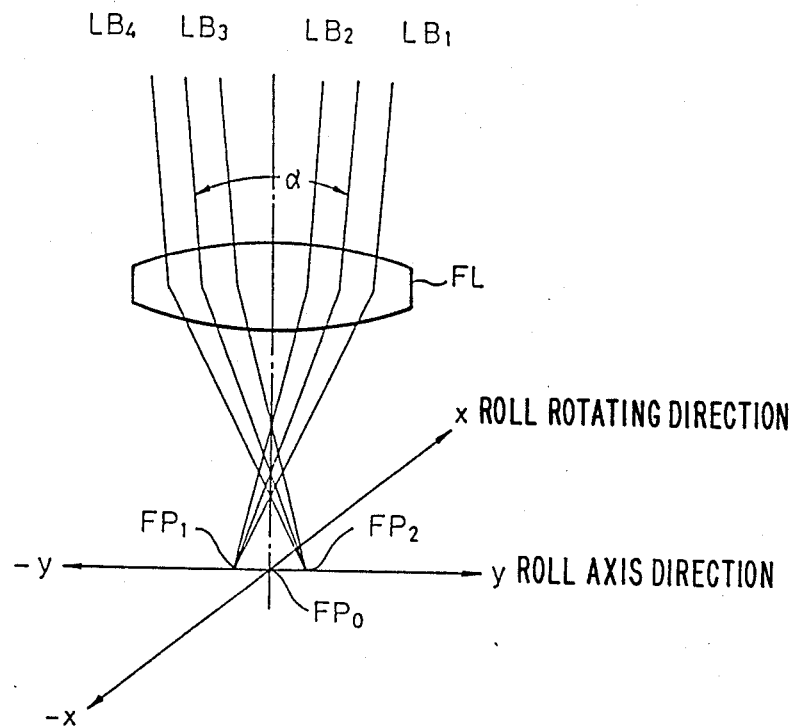
FIG. 16 is a side view showing the state of a focused beam.

Namely, as shown in FIG. 15, the laser beams $LB_1$ and $LB_2$, and $LB_3$ and $LB_4$ are made incident on the bending mirrors $BM_5$ and $BM_6$ as the parallel beams $LB_{12}$ and $LB_{34}$, respectively, and then as shown in FIG. 16, the angle $\alpha$ formed between the merged beams is made $\alpha \neq 0°$ by controlling the beams angles $\phi_5$ and $\phi_6$ at the above bending mirrors $BM_5$ and $BM_6$.

Therefore, the focusing points of the parallel beams $LB_{1,2}$ and $LB_{3,4}$ are displaced to $FP_1$ and $FP_2$, respectively, from point $FP_0$ (this point is suitable as the focal position at which the laser beam LB is made incident straight into the lens FL in embodiment 1) where all the laser beams are parallel to one another. In the drawing, X and –X indicate a roll rotating direction and Y and –Y indicate a roll axial direction.

FIG. 15 shows the embodiment in which four laser beams are used, but the number of laser beams is not limited thereto and may be more or less. If the number of laser beams is increased, the depth of the hole worked is nearly linearly increased, and holes having a different diameter from one another can be formed according to the number of laser beams. Therefore, the number of laser beams is selected according to the required surface roughness of a roll to be dulled.

Figure 17:
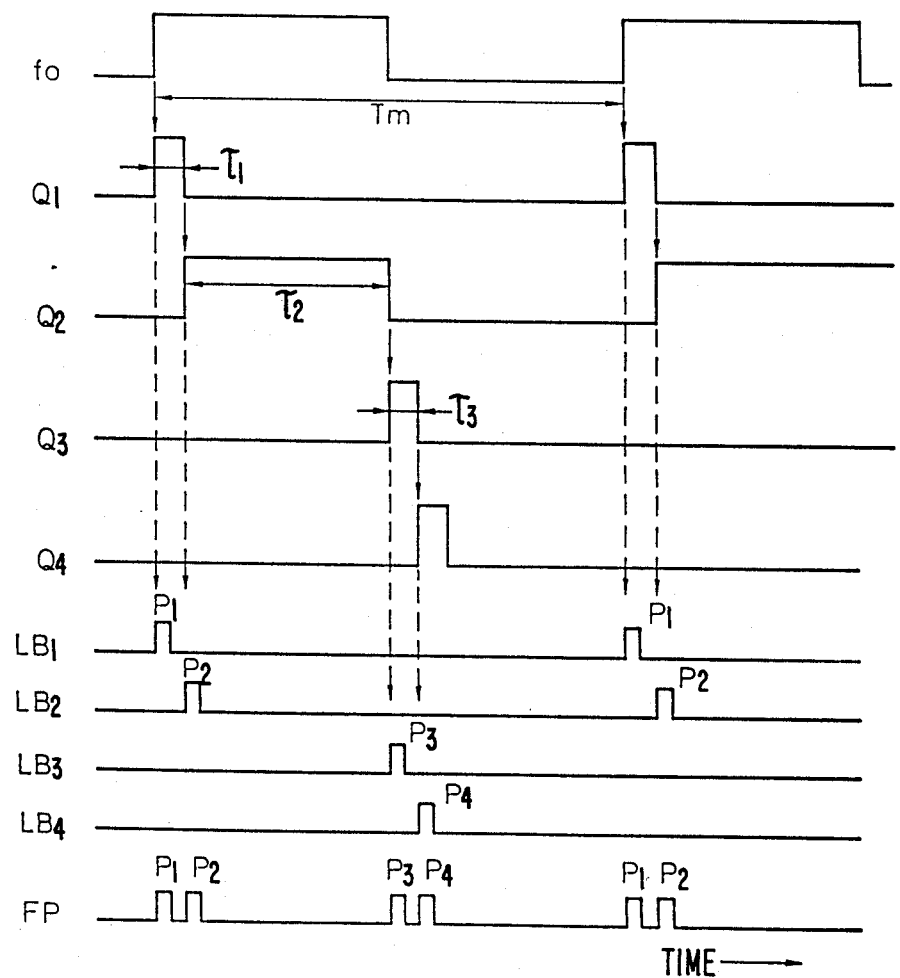
FIG. 17 is a functional time chart showing the relationship among the control signals.

FIG. 17 shows a functional time chart of the control signals of FIG. 16. In FIGS. 16 and 17, one dulling is effected by the laser beams $LB_1$ and $LB_2$, and the other dulling is effected by the laser beams $LB_3$ and $LB_4$. Namely, to make the pulsed laser incident on the surface of the rotating roll, the Q-switching control signal $Q_1$ *is made closer to* $Q_2$ and $Q_3$ is made closer to $Q_4$, and thus the Q-switch control time delays $\tau_1$ and $\tau_3$ are shortened and therefore, a dulling effect is doubled. Also, a space between the pulsed laser beams $LB_{1,2}$ and $LB_{3,4}$ can be set at $\tau_2$, and thus a space of a crater at a dulling is determined. This embodiment can operate at double the dulling speed of the above embodiment 2 by using $\tau_2$ in about half of the dulling period thereof.

Figure 18A:
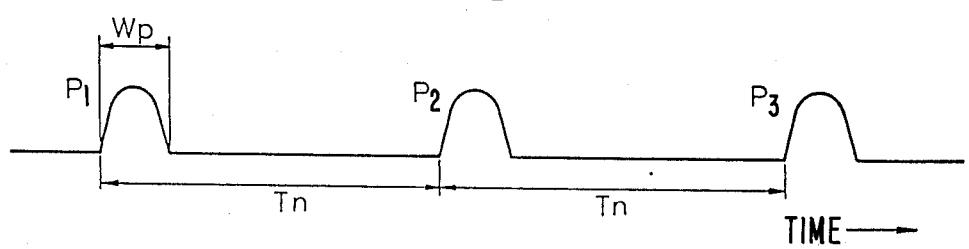
Figure 18B:
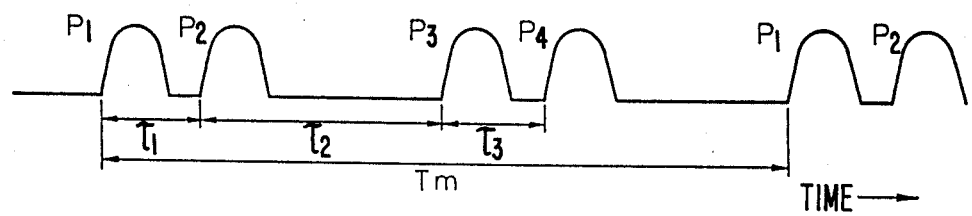
FIGS. 18b and 18c are time charts, respectively, of the generation of combined pulse laser.
Figure 18C:
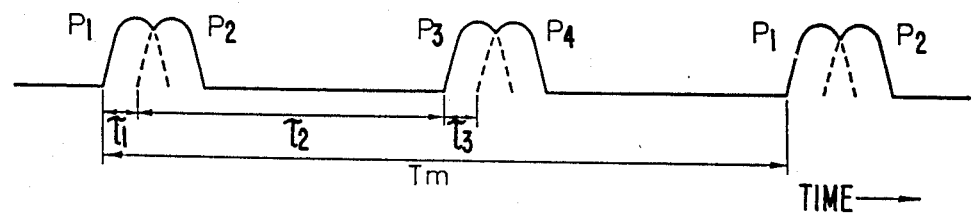

FIGS. 18a, 18b, and 18c show the generation of the pulse beam group, wherein FIG. 18a shows a pulse train from one Q-switched laser and FIGS. 18b and 18c show the pulse trains of this embodiment, respectively, which are generated by the control signal shown in FIG. 17. FIG. 18c shows the pulse train when $OM_1$ and $OM_3$ are set at a shorter time than the width $W_p$ of the pulse laser.

The pulse beams of four Q-switched lasers are controlled by the method according to this embodiment to dull the surface under the following conditions:

| | |
|---|---|
| $LB_1$-$LB_4$ | 2 kW |
| $f_0$ | 20 kHz |
| $T_m$ | 50 μs |
| $\tau_1, \tau_3, \tau_4$ | 2 μs |
| $\tau_2$ | 23 μs |
| FL | 25 mm |
| $FP_1, FP_2$ | 50 μm |
| $\theta_1, \theta_2$ | 3 mrad |
| $\theta_3, \theta_4$ | 2 mrad |
| Roll diameter | 500 mm |
| Roll speed | 300 to 500 rpm |
| RF output | 40% |

Figure 19:
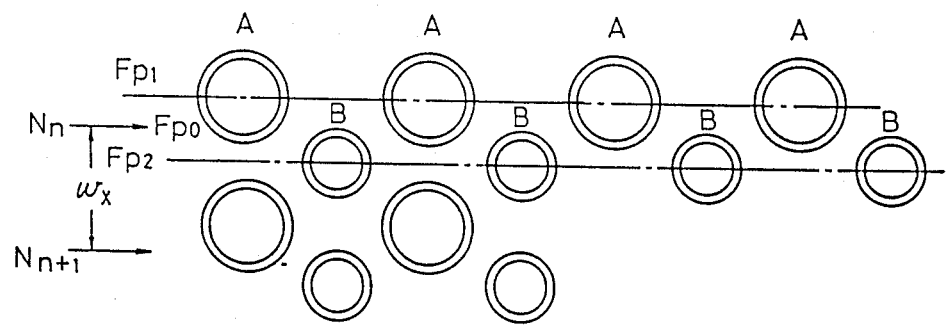
FIG. 19 is a plan view, on an enlarged scale, of the roll surface worked by the pulse laser output device according to the present invention.
Figure 20:
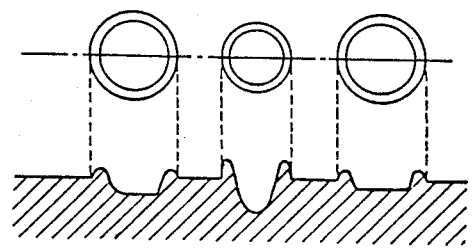
FIG. 20 are explanatory plan and sectional views of the worked roll surface.

In the above dulling, large and small holes having an inside diameter of 120 and 80 μm were formed in the pattern shown in FIG. 19, and had the sectional shapes as shown in FIG. 20. The dulling was made with a roughness of 3.5 μm and the transfer to the steel sheet was 80%, which provided an improved abrasion resistance of the roll.

In FIG. 19, when dulling the surface of a roll, $W_x$ shows the space between the n number of trains : $N_n$ and the n+1 number of trains : $N_{n+1}$ when one of the trains of uneven dulling is formed by rotating a roll.

Embodiment 4

In this embodiment, a beam splitter BS is used, instead of the merged mirror TM of embodiment 2, to coaxially merge the pulse laser beam group.

The "beam splitter" referred to herein is an optical element used to separate a light beam of a predetermined wavelength, when incident at an inherent angle, into a reflected light beam (T) and a transmitting light beam (R). Normally, such an optical element has a structure in which several kinds of substances having different refraction factors are laminated on a base layer of a silica or the like, and due to the characteristics of the laminated structure, the reflected light beam (T) and the transmitting light beam (R) can be polarized simultaneously, as required. In this case, the transmitting light beam (R) of $LB_1$ is a polarized component ($P_{wave}$) parallel to the incident plane of $LB_1$, and the reflected light beam (T) of $LB_2$ is a horizontal polarized component ($S_{wave}$).

Figure 21A:
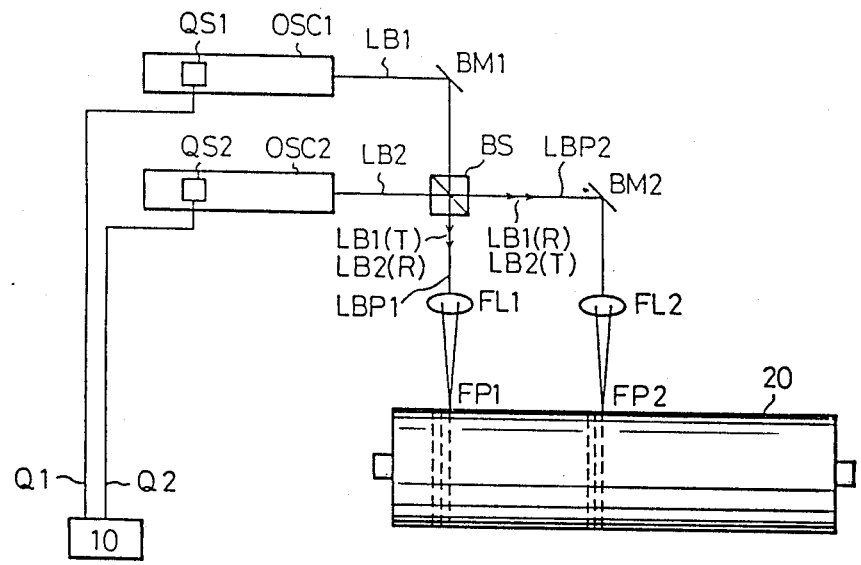
FIGS. 21a and 21b are block diagrams showing the construction of the dulling system according to the another embodiment of the present invention.

FIG. 21a shows the basic construction of the pulse laser controller using two pulses according to this embodiment, wherein $OSC_1$ and $OSC_2$ denote laser oscillators, respectively, and $QS_1$ and $QS_2$ denote Q-switches, respectively, corresponding to the laser oscillators $OSC_1$ and $OSC_2$, respectively. Reference numeral 10 denote a Q-switching control system which delivers Q-switched signals $Q_1$ and $Q_2$ sequentially, and laser beams $LB_1$ and $LB_2$ are generated from the laser oscillators $OSC_1$ and $OSC_2$ correspondingly. The laser beam $LB_1$ is supplied directly and $LB_2$ is supplied through a bending mirror $BM_l$ to the beam splitter BS, so that a transmitted beam $LB_1$ (T) of the laser beam $LB_1$ and the reflected beam $LB_2$ (R) of the $LB_2$ are merged into a group $LBP_1$ of coaxial laser beams.

On the other hand, the transmitted beam LB (T) of $LB_2$ and reflected beam $LB_1$(R) are merged in another direction from the beam splitter BS into a group of coaxial beams $LBP_2$.

The laser beam groups $LBP_1$ and $LBP_2$ are focused by focusing lenses $FL_1$ and $FL_2$, respectively, and at the focusing points $FP_1$ and $FP_2$, are focused as laser beam groups $LBP_1$ and $LBP_2$ into a single laser beam, thereby permitting a rapid two-divisional dulling of the roll surface.

Figure 21B:
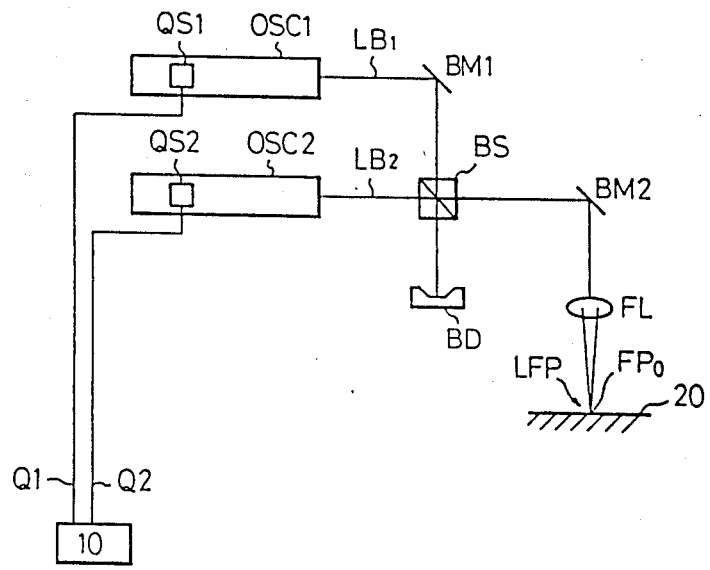

As shown in FIG. 21(b), only the laser beam group $LBP_2$ merged by the beam splitter is used, and the other laser beam group $LBP_1$ is not used and is absorbed by a beam damper BD. In this case, the dulling speed is a half of the arrangement shown in FIG. 21(a).

Reference numeral 20 denotes the surface of a roll to be dulled. With the two laser beams, the depth of the hole is nearly double and a number of laser beams is selected according to the required quality of the surface roughness of a roll to be dulled.

When the dividing function of the beam splitter by polarization is used and the laser beams $LB_1$ and $LB_2$ have 50% P and S waves, respectively, as random-polarized, the relationship $PL_1 = PL_2$ can be obtained by equalizing the powers of the laser beams $LB_1$ and $LB_2$ and using the inherent incident angle of the beam splitter (as an incident angle providing a complete separation between P and S component waves).

When the laser beams $LB_1$ and $LB_2$ are not completely random-polarized and the P and S waves cannot be separated at 50%, the relationship $PL_1 = PL_2$ can be obtained by adjusting the powers of the laser beams $LB_1$ and $LB_2$ to the separation ratio between the P and S waves.

In this embodiment, as described in embodiment 2, the frequency $f_0$ of the pulse group for dulling the roll surface is set at the pulse generator PG, a group of pulses having a predetermined time delay therebetween is generated synchronously with the first signal of the frequency, whereby $LB_1$ and $LB_2$ can be controlled by Q-switching. By nulling the pulse separations $\tau_1$, both pulses also can be projected simultaneously.

Figure 22A:
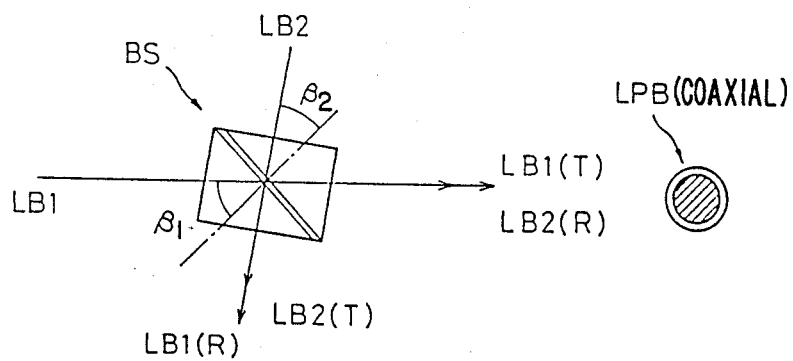
FIG. 22a is a view showing the beam combination by the beam splitter.
Figure 22B:
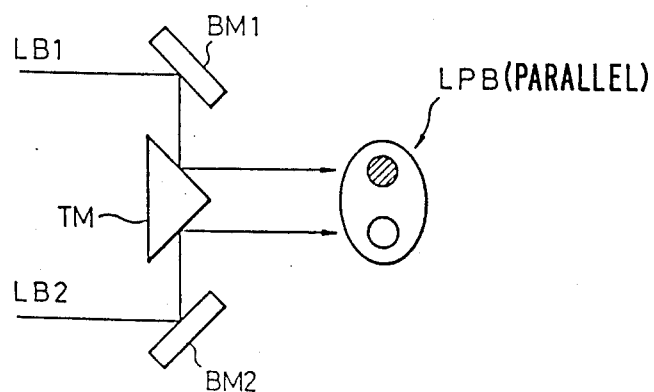
FIG. 22b is a explanation view showing the beam combination by the total reflecting mirror.

FIGS. 22a and 22b show the merging of laser beams, wherein FIG. 22a shows a laser beam merging by the beam splitter, in which, by setting the incident angle $\beta_1$ and $\beta_2$ of the input laser beams $LB_1$ and $LB_2$ to a same value within the inherent incident angle of the beam splitter BS, the P wave of $LB_1$ and S wave of $LB_2$ can be merged into a coaxial beam LBP, and FIG. 22b shows a laser beam merging by the merged mirror TM as shown in embodiment 2. In this case, the input laser beams $LB_1$ and $LB_2$ can be merged into parallel but not coaxial beams, and therefore, the diameter of the merged beam LB is enlarged.

Note that this working by laser beams is not limited to the surface of a roll, but can be applied to any workpiece. The kinds of laser used in this dulling are solid lasers such as YAG, ruby lasers, etc.

The pulse waveforms of the two Q-switched lasers were controlled by the method according to this embodiment to dull the surface of a roll, and the Q-switched laser pulse waveforms were controlled under the following conditions:

| | |
|---|---|
| Beam splitter | 2 inches in diameter |
| Laser beam | |
| $\tau_0$ | 300 nsec |
| $\tau_1$ | 5 μsec |
| $f_0$ | 20 kHz |

-continued

| Lens focal length FL | 25 mm |
|---|---|
| Roll shape, | |
| length | 1500 mm |
| diameter | 600 mm |
| RF, output | 40% |
| Work time | about 1 hour |

The results were as follows:

The work time was about 1 hour, which obtained the same effect as obtained by using two embodiments of the pulse laser embodiment 2, the inside diameter of the hole formed by dulling was 100 μm and the roughness was 2.2 μm, the transfer to the surface of a steel sheet was as high as 80%, and the abrasion resistance was improved.

According to this embodiment, as above-mentioned, the pulse laser beams can be merged coaxially, so that the focusing system using lens can be made compact and simple and the positioning at the focusing point simplified. Since peak values can be set for individual pulses in the pulse group, it is possible to control the fusing and evaporation of the object in the hole making in the dull-process, thereby permitting holes of an appropriate hardness to be formed. Further, since the separation from one to another pulse group can be controlled, crater formation or drilling further suitable for dulling can be effectively carried out.

Industrial Applicability:

According to the invention, it is possible to control the Q-switched pulse waveform of the continuous excitation solid laser to a condition desired for the roll dulling, and to set a convergent beam diameter, a peak value, irradiation time and a irradiated state, etc., of each pulse in the pulse group, and therefore fusing and evaporation of an irradiated article can be controlled, and accordingly, a crater of a proper hardness can be formed and a shape and position of the crater can be controlled, and as a result, it is possible to obtain an arrangement of the crater which is suitable for dulling, and thus provide a significantly improved method and apparatus for dulling by a pulse laser, which will have a substantial affect in the industry.

We claim:

1. A method for roll-dulling by a pulse laser, in which a continuous wave solid state laser is changed to a pulsed laser by Q-switching, and the roll surface is dulled by said pulsed laser, said method being characterized in that when said pulse laser power is output the cavity loss of a laser oscillator during a pulse off is decreased in accordance with a drop in a power output of a radio-frequency signal applied to a Q-switch and a surplus accumulation of excited molecules in the laser resonator is controlled, and as a result, irregularity of the pulse waveform is decreased, and said pulse peak value and the half-power width of the pulse waveform is controlled to full width of half maximum that required for roll-dulling process.

2. A method as claimed in claim 1 characterized in that the roll surface is dulled by a laser beam oscillated by a laser oscillator consisting of one of the Q-switch controller, the radio-frequency signal source, and the Q-switch modulator.

3. A method as claimed in claim 1 characterized in that the roll surface is dulled by a laser beam train formed by laser beams oscillated by the laser oscillators consisting of the Q-switch controller, a plurality of radio-frequency signal sources connected thereto, and the Q switch.

4. A method as claimed in claim 3 characterized in that the plurality of laser beams is made into a laser beam group and the pulse group is formed with a interval of each pulse laser corresponding to a delay, one after another of the Q-switching times of said laser beam group, and controlling respectively the pulse peak value of the laser to a fixed value, to thereby form a pulse group suitable for dulling the roll surface.

5. A method as claimed in claim 5, characterized in that a each beam diameter of the plurality of laser beams is enlarged by the beam expander and said laser beams are combined into a laser beam group made parallel or nonparallel.

6. A method as claimed in claim 4 characterized in that the component of each laser of at least two laser beams in the plurality of laser beams is separated and then combined coaxially, and then the roll surface is irradiated by said combined laser beams.

7. An apparatus for roll-dulling by a pulsed laser, in which the Q-switch controller comprises a pulse oscillator for determining a pulse repetition rate and the output power of a radio-frequency signal and a one-shot multi vibrator for determining the pulse interval, and the laser oscillator comprises a radio-frequency signal source to which a power output exchange signal is applied by the Q-switch controller and the Q-switching is effected upon output of the signal to said radio-frequency source.

8. An apparatus as claimed in claim 7, characterized in that, in accordance with the laser oscillator which comprises the Q-switch controller, the radio-frequency signal source connected thereto and the Q-switch, a pulse interval is provided between each pulse and the pulse peak value of each pulse is controlled, and the pulse laser group consists of the above plurality of pulses.

9. An apparatus as claimed in claim 8, characterized in that a laser beam expander is provided between the laser oscillator and the mirror and a laser beams are focused on the laser beam grouping parallel or nonparallel state.

10. An apparatus as claimed in claim 8 or 9, characterized in that the beam splitter receives laser beams from a pair of at least two laser oscillators and separates each laser component and combines them coaxially.

11. A method as claimed in claim 4 characterized in that the component of each laser of at least two laser beams in the plurality of laser beams is separated and then combined coaxially, and then the roll surface is irradiated by said combined laser beams.

12. A method for roll-dulling by a pulse laser, in which a continuous wave solid state laser is changed to a pulsed laser by Q-switching, and the roll surface is dulled by said pulsed laser, said method being characterized in that when said pulse laser power is output the cavity loss of a laser oscillator during a pulse off is decreased and a surplus accumulation of excited molecules in the laser resonator is controlled, and as a result, irregularity of the pulse waveform is decreased, and said pulse peak value and the half-power width of the pulse waveform is controlled to full width of half maximum that required for roll-dulling process, wherein the roll surface is dulled by a laser beam train formed by laser beams oscillated by the laser oscillators consisting of the Q-switch controller, a plurality of radio-frequency signal sources connected thereto, and the Q switch.

13. A method as claimed in claim 12, characterized in that the plurality of laser beams is made into a laser beam group and the pulse group is formed with a interval of each pulse laser corresponding to a delay, one after another of the Q-switching times of said laser beam group, and controlling respectively the pulse peak value of the laser to a fixed value, to thereby form a pulse group suitable for dulling the roll surface.

14. A method as claimed in claim 13, characterized in that a each beam diameter of the plurality of laser beams is enlarged by the beam expander and said laser beams are combined into a laser beam group made parallel or nonparallel.

15. A method as claimed in claim 13, characterized in that the component of each laser of at least two laser beams in the plurality of laser beams is separated and then combined coaxially, and then the roll surface is irradiated by said combined laser beams.

16. A method as claimed in claim 14, characterized in that the component of each laser of at least two laser beams in the plurality of laser beams is separated and then combined coaxially, and then the roll surface is irradiated by said combined laser beams.

* * * * *